United States Patent [19]

Dor

[11] Patent Number: 5,331,459
[45] Date of Patent: Jul. 19, 1994

[54] NIGHT VISION SYSTEM AND MOUNTING ASSEMBLY

[75] Inventor: Amotz Dor, Scottsdale, Ariz.

[73] Assignee: Litton Systems, Inc., Beverly Hills, Calif.

[21] Appl. No.: 805,187

[22] Filed: Dec. 10, 1991

[51] Int. Cl.⁵ .............................................. G02B 23/12
[52] U.S. Cl. ................................... 359/409; 359/413; 359/630
[58] Field of Search ............... 359/409, 410, 411, 407, 359/630, 413

[56] References Cited

U.S. PATENT DOCUMENTS

| | | | |
|---|---|---|---|
| 4,202,601 | 5/1980 | Burbo et al. | 359/409 |
| 4,449,787 | 5/1984 | Burbo et al. | 359/411 |
| 4,544,844 | 10/1985 | Moyers . | |
| 4,592,096 | 6/1986 | Glasheen | 359/409 |
| 4,755,664 | 7/1988 | Holmes et al. | 359/630 |
| 4,961,626 | 10/1990 | Fournier, Jr. et al. | 359/630 |
| 4,968,123 | 11/1990 | Fournier, Jr. et al. | 359/630 |
| 5,000,544 | 3/1991 | Staveley | 359/630 |
| 5,179,735 | 1/1993 | Thomanek | 359/409 |

OTHER PUBLICATIONS

Eyes in the Dark—Night Vision in a New Light, by Greg Walker, dated Jul. 1989, pp. 54-61, ICA.
Night-Vision Goggles, by Mark Hewish, in Defense Electronics & Computing, dated Feb. 1992, pp. 17-24.
We Own the Night, by Doug Richardson, Armada International dated Oct./Nov. 1991, pp. 44-50.

Primary Examiner—Martin Lerner
Attorney, Agent, or Firm—Poms, Smith, Lande & Rose

[57] ABSTRACT

A night vision system usable as either a helmet mounted or face mask mounted monocular, or as a pocketscope, comprising an optical portion having an objective lens, an eyepiece, and an image intensification apparatus for intensifying a received image intermediate the objective lens and the eyepiece, a control housing affixed to the optical portion and having internal circuitry for powering the optical portion, and an apparatus for selectively mounting the monocular in an operational position adjacent to a desired one of an operator's eye and being rapidly switchable between the eyes.

43 Claims, 5 Drawing Sheets

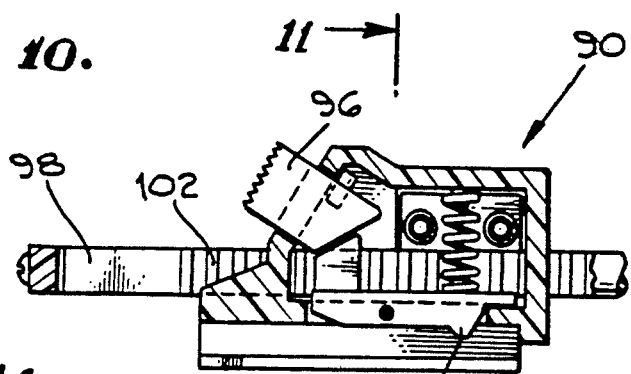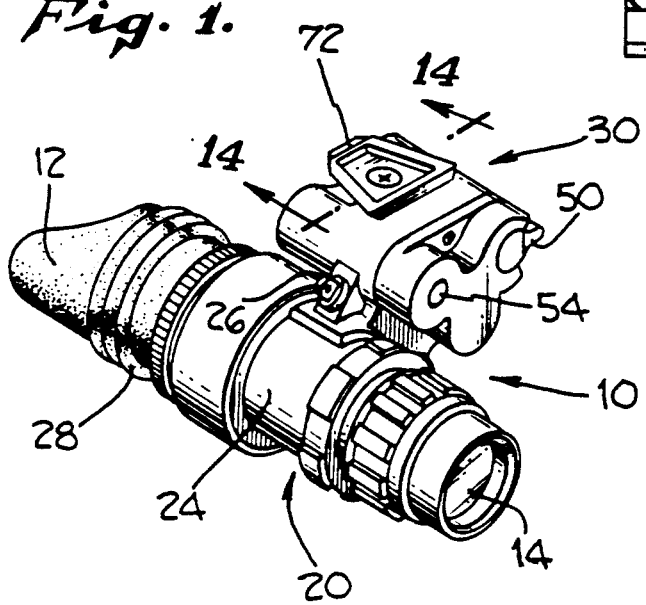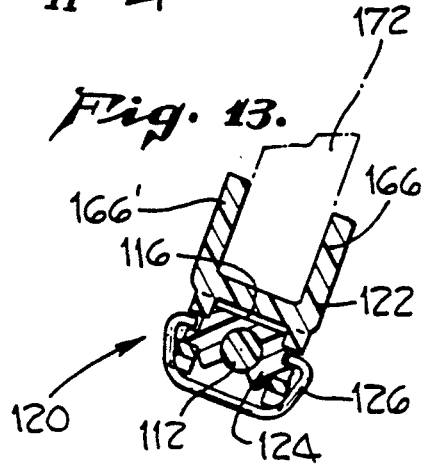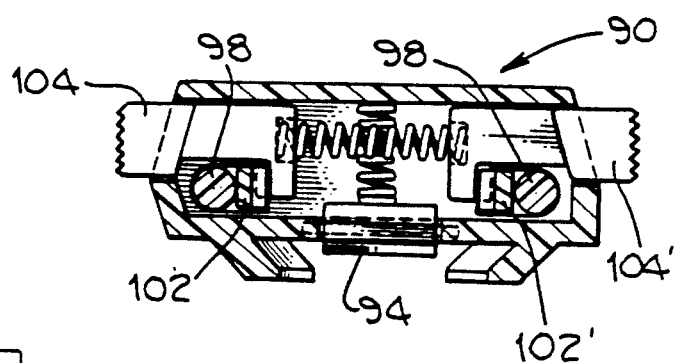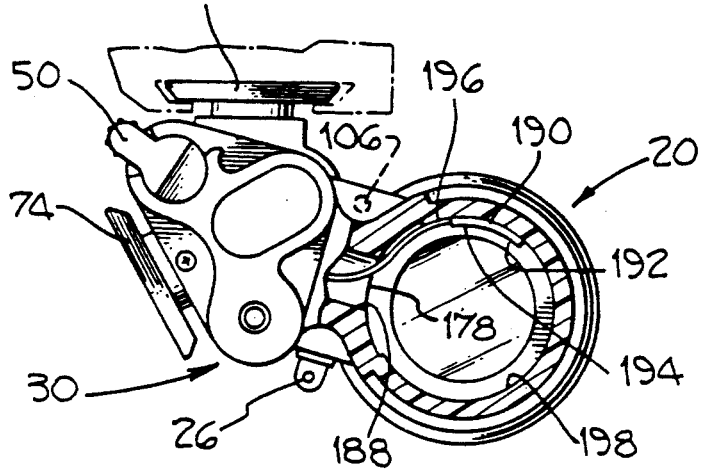

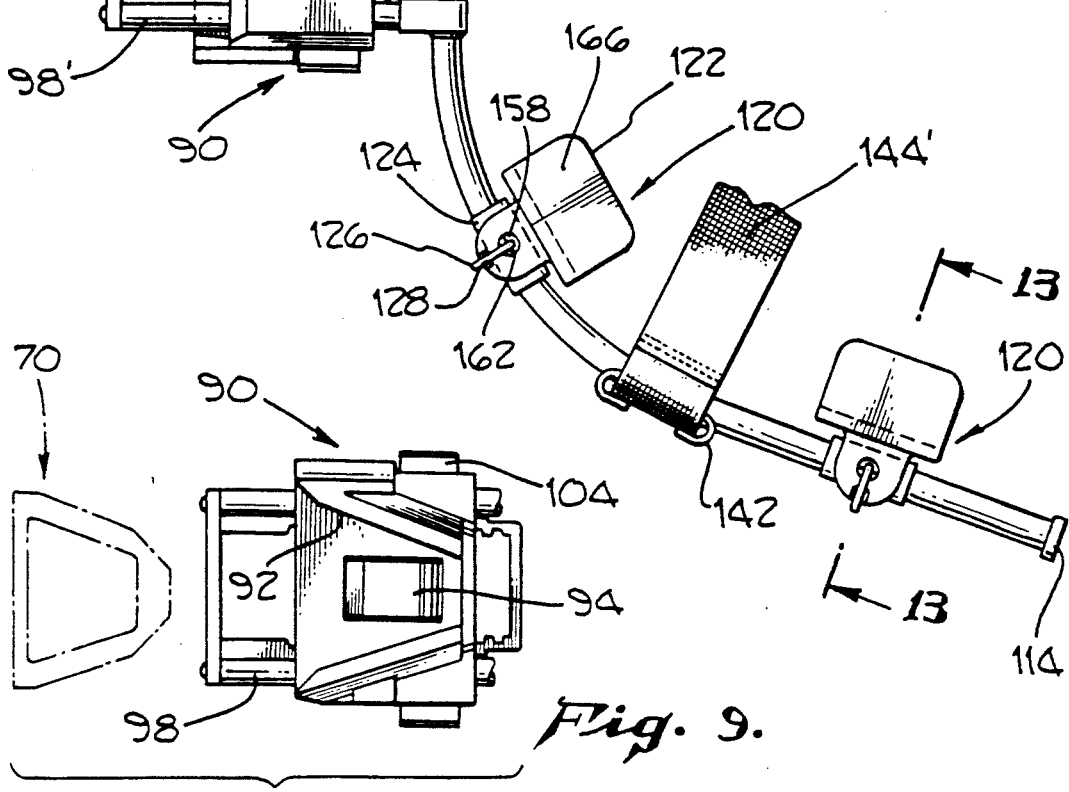

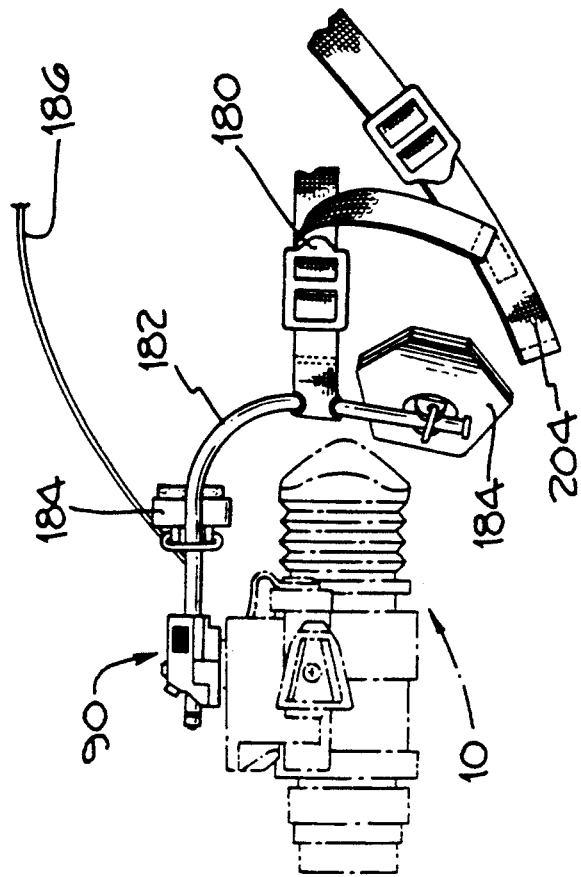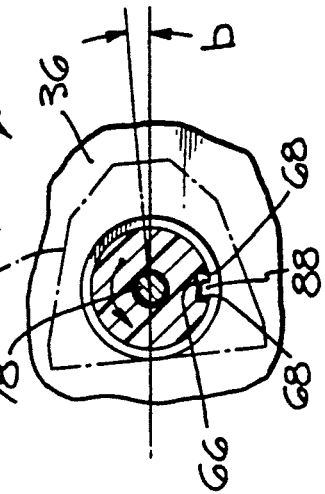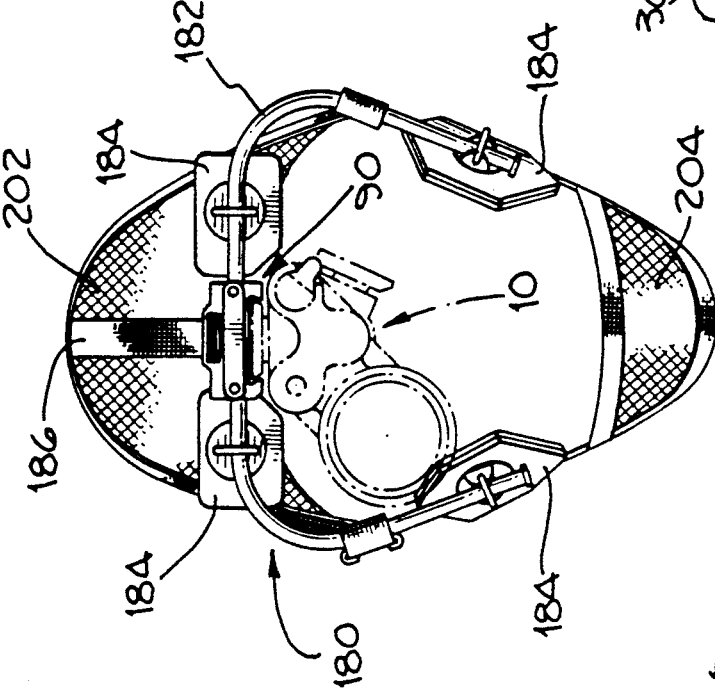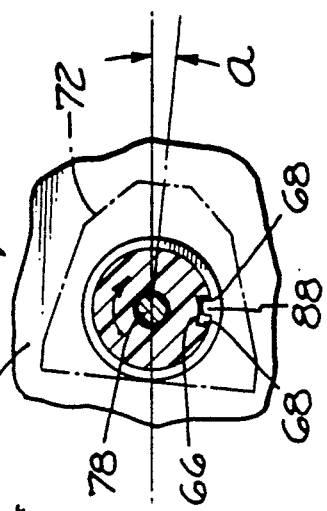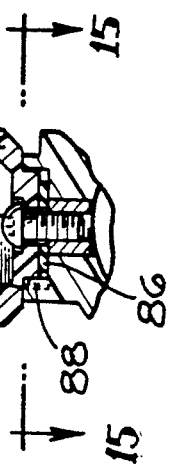

NIGHT VISION SYSTEM AND MOUNTING ASSEMBLY

BACKGROUND OF THE INVENTION

1. Field of the Invention

The present invention relates to a night vision system, and more particularly to an improved night vision system usable as either a helmet mounted or face mask mounted monocular, or as a pocketscope.

2. Description of Related Art

Night vision systems are commonly used by military and law enforcement personnel for conducting operations in low light or night conditions. Night vision systems are also used to assist pilots of helicopters or airplanes in flying at night. Such night vision systems either take the form of binoculars, having separate eyepieces for each eye, or monoculars, having only a single eyepiece.

A night vision system intensifies the ambient light to produce an image. These systems require some residual light, such as moon or starlight, in which to operate. The ambient light is intensified by the night vision scope to produce an output image which is visible to the human eye. The present generation of night vision scopes utilize image intensification technologies to intensify the low level of visible light and also make visible the light from the infra-red (IR) spectrum. The image intensification process involves conversion of the received ambient light into electron patterns and projection of the electron patterns onto a phosphor screen for conversion of the electron patterns into light visible to the observer. This visible light is then viewed by the operator through a lens provided in the eyepiece of the system.

The typical night vision system has an optics portion and a control portion. The optics portion comprises lenses for focusing on the desired target, and an image intensifier tube. The image intensifier tube performs the image intensification process described above. The control portion comprises the electronic circuitry necessary for controlling and powering the optical portion of the night vision system. Although technologically advanced, all of the prior art systems fail to meet one or more of the human factors requirements of the typical operator.

For example, the typical control portions take up considerable space in comparison to the optical portion. To be most effective, a night vision system must be small, rugged and lightweight. While binocular systems have the advantage of allowing the operator to determine depth of field, binocular systems are often bulkier and heavier. Although monocular systems are smaller, the control portions are often as large as the optical portion. This makes the device cumbersome to manipulate.

Monocular systems are additionally advantageous since it is often desirable for the operator to have a single eye not coupled to the night vision system, or "free". This free eye can remain adapted to the darkness, so that if the night vision system is disengaged the operator will not be temporarily blinded as his iris dilates to adapt for the night conditions. The operator may also wish to keep one eye free in order to aim a weapon, since it is also common for weapons to be equipped with an eyepiece for sighting purposes. These eyepieces frequently utilize a night vision system as well. An operator may utilize a monocular system with a first eye, in conjunction with a night vision system equipped on a weapon for use by the other eye. Thus, monocular systems are frequently preferred over binocular systems.

It is common for operators to use a night vision system as a pocketscope. When not in use, the pocketscope can be conveniently stowed in a pocket or backpack, or can be attached to a lanyard and hung from the operator's neck. When needed, the operator would hold the pocketscope up to his eye to observe the night environment. To be most effective, a pocketscope must be small, lightweight and easy to manipulate.

If an operator desires hands free operation, binocular and monocular systems are frequently mounted to a mask worn on the operator's face. The typical face mask mounting assembly comprises a bar or rod having a plurality of cushion plates attached thereto. The bar would partially encircle the operator's face, and the cushion plates would press against specific points on the face, such as the cheeks and the forehead. The bar is held to the face by use of a strap which wraps around the head and connects to the bar at two places. At the forehead portion of the bar, a mount is provided which would attach to the binocular or monocular system. As discussed below, this mounting method has significant disadvantages.

If the operator is wearing a monocular system, it is often necessary to switch the monocular from eye to eye. To accommodate this, face masks either utilize a pair of mounting points, or a pivoting system in which the monocular is pivoted from the left eye position to the right eye position. A significant problem with this configuration is that it is time consuming to move the monocular from one eye to the next. The monocular must be readjusted in the new position to accommodate the precise position of the operator's eye. While the time required to make the configuration change and adjustment may be slight, it could mean the difference between life and death of an operator.

Another type of prior art face mask has a horizontal bar mounted to the front of the face mask above the operator's eyes, to which a night vision monocular is attached. A locking screw holds the monocular in a position on the bar. The operator slides the monocular along the bar to move it from proximity with one eye to the second eye. This presents a problem to the operator, since each time the position of the monocular is changed, the operator must carefully calibrate the new position with his eye to effectively use the monocular.

Another problem with face mask mounting is that the adjustments of the mask could be altered by the wearing of a helmet. If an operator intends to wear a standard ballistic helmet, the mask must be first adjusted to the operator's face prior to putting the helmet on. The operator adjusts the mask for alignment of the scope with the eyes and tightens the mask so that it remains in the adjusted position. When the helmet is put on the operator's head, the bulk and weight of the helmet frequently interferes with the upper portion of the face mask. This forces the mask downward relative the operator's face knocking the monocular or binocular out of alignment with the operator's eyes. The operator must then readjust the mask to accommodate the weight and bulk of the helmet. Alternatively, the operator can readjust the helmet so that it rides higher on the head, and does not interfere with the mask. However, this usage of the helmet is dangerous for the operator, since it removes the temples, forehead and back of the head from protection by the helmet.

Since conditions often occur in which there is extremely little ambient light, it is common for night vision systems to also include a small infra-red radiation source. The radiation source can be energized by the operator to illuminate the local area with a cone of infra-red light which, although invisible to the unaided eye, can be seen by the observer through the eyepiece of the night vision system. Frequently, operators mistakenly leave the infra-red source powered on, without realizing it. This poses a significant danger to the operator, since hostile forces equipped with night vision systems can also see the radiation source.

The prior art devices provide a mechanism for insuring that the operator knows the infra-red source is activated. The switch which activates the source must be simultaneously turned and pushed. The additional step of pushing requires an intentional act by the operator, so that the source could not be activated by accident. However, once the source is activated, the switch remains in the activated position. Since the operator does not receive any additional notification that the infra-red source is activated, the operator could forget to de-activate the source, and be seen by hostile forces.

Most night vision systems utilize an internal battery which provides electrical power to the image intensification tube and the radiation source. These battery powered systems can only run for a finite period of time before the battery must be replaced. Once the battery has run down, the night vision system is rendered useless. None of the prior art night vision systems provide a mechanism visible within the eyepiece for warning the operator that the battery is running low and should be replaced.

Thus, it would be desirable to provide a human engineered night vision system with a compact control section, so that it could be easily manipulated by an operator as a pocketscope for hand held operations. It would be further desirable to provide a night vision monocular which could be easily and rapidly switched between an operator's eyes. It would be further desirable to provide a mounting system for a monocular or binocular to be used in conjunction with the wearing of a helmet, or in association with a face mask. It would also be desirable to provide a night vision monocular with an IR illumination system which would allow an operator to only permit a burst of IR light to be illuminated from the system. It would also be desirable to provide a night vision monocular having a mechanism that more reliably informs the operator that the IR illumination system is in use. It would be still further desirable to provide a night vision system having a mechanism that reliably informs the operator that the internal battery is running low.

SUMMARY OF THE INVENTION

Accordingly, a principal object of the present invention is to provide a human factors designed night vision system which can be easily manipulated by an operator as a pocketscope for hand held operations.

Another object of the present invention is to provide a night vision monocular which can be rapidly changed from one eye to the next.

Another object of the invention is to provide a night vision monocular which mounts directly to a standard ballistic helmet, or which can be used with a face mask.

Yet another object of the present invention is to provide a night vision system with an IR illuminating capability which can be utilized in a burst mode of operation.

Still another object of the present invention is to provide a night vision system with an indicating capability to inform the operator that the IR illuminating system is in use.

Still another object of the present invention is to provide a night vision system with an indicating capability to inform the operator that the internal battery is running low.

To achieve the foregoing objects and in accordance with the purpose of the invention, the night vision monocular of this invention comprises an optical portion having an objective lens, an eyepiece, and an image intensification tube for intensifying a received image intermediate the objective lens and the eyepiece, a control housing affixed to the optical portion and having internal circuitry for powering the optical portion, and an apparatus for selectively mounting the monocular in either of two operational positions corresponding to a desired one of an operator's eyes and being rapidly switchable between the operational positions. More specifically, the selective mounting apparatus comprises a first dovetail mounting plate affixed to a first surface of the control housing, and a second dovetail mounting plate affixed to a second surface of the control housing, and a carriage configured to receive and secure a selected one of the dovetail plates, the carriage being selectively adjustable to vary the distance between the operator and the eyepiece. The monocular of the present invention further comprises an illuminating device for momentarily illuminating the field of view of the optical portion with infra-red light. The night vision monocular of the present invention further comprises an indicating device for indicating to the operator that the illuminating device is energized. The night vision system of the present invention further comprises an indicating device for indicating to the operator that the internal battery is running low. The monocular of the present invention further comprises a mechanism for adjusting the azimuth of the monocular relative the operator's eye.

In accordance with one aspect of the invention, the night vision monocular is secured to a frame conforming to the shape of the visor of a standard ballistic helmet, as commonly used by United States Armed Forces. The frame is affixed to the helmet by use of a plurality of adjustable cushions each having a retaining portion pivoting from the frame and engaging the visor, an adjustable strap having a left and right portion attaching to the frame at left and right attachment points respectively and a rear portion joining to the left and right portions relative to the top of the helmet, and a hook provided at the end of the rear portion to engage the back of the helmet.

In another aspect of the present invention, the night vision monocular is provided with double quick release mounts and a single receiving member to engage either of the double mounts. The receiving member is provided on external support, comprising either a helmet or a face mask. The receiving member has a shape corresponding to the dove tail plates, and a selective locking mechanism to secure the plates with the member.

A more complete understanding of the night vision monocular of the present invention will be afforded to those skilled in the art, as well as a realization of additional advantages and objects thereof, by a consideration of the following detailed description of the preferred embodiment. Reference will be made to the appended sheets of drawings which will be first described briefly.

BRIEF DESCRIPTION OF THE DRAWINGS

FIG. 1 shows a perspective view of a night vision monocular system;

FIG. 7 shows the night vision monocular system in association with the helmet mount assembly of FIG. 5, for use with an operator's left eye;

FIG. 8 shows a top view of the helmet mount assembly of FIG. 5;

FIG. 9 shows a bottom view of the dovetail carriage for use on the helmet mount assembly;

FIG. 10 shows the interior of the dovetail carriage as taken through the section 10—10 of FIG. 8;

FIG. 11 shows the interior of the dovetail carriage as taken through the section 11—11 of FIG. 10;

FIG. 12 shows a partial cutaway view of the night vision monocular system;

FIG. 13 shows a sectional view of a retainer cushion of the helmet mount assembly as taken through the section 13—13 of FIG. 8;

FIG. 14 shows a sectional view of the dovetail mounting plate as taken through the section 14—14 of FIG. 1;

FIG. 15 shows a sectional view of the dovetail mounting plate as taken through the section 15—15 of FIG. 14;

FIG. 16 shows another sectional view of the dovetail mounting plate as taken through the section 15—15 of FIG. 14, FIGS. 17 and 18 present respective frontal and left side elevation views of a face mask mount for a night vision monocular according to the present invention.

DESCRIPTION OF THE PREFERRED EMBODIMENTS

Figure 2:
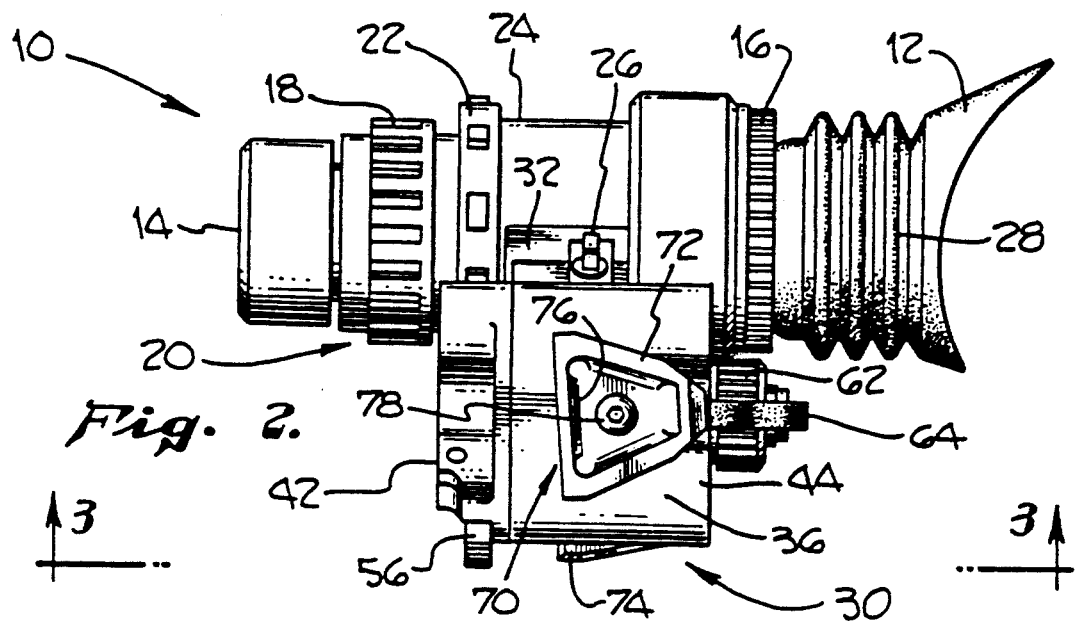
FIG. 2 shows a top view of the night vision monocular system of FIG. 1.
Figure 3:
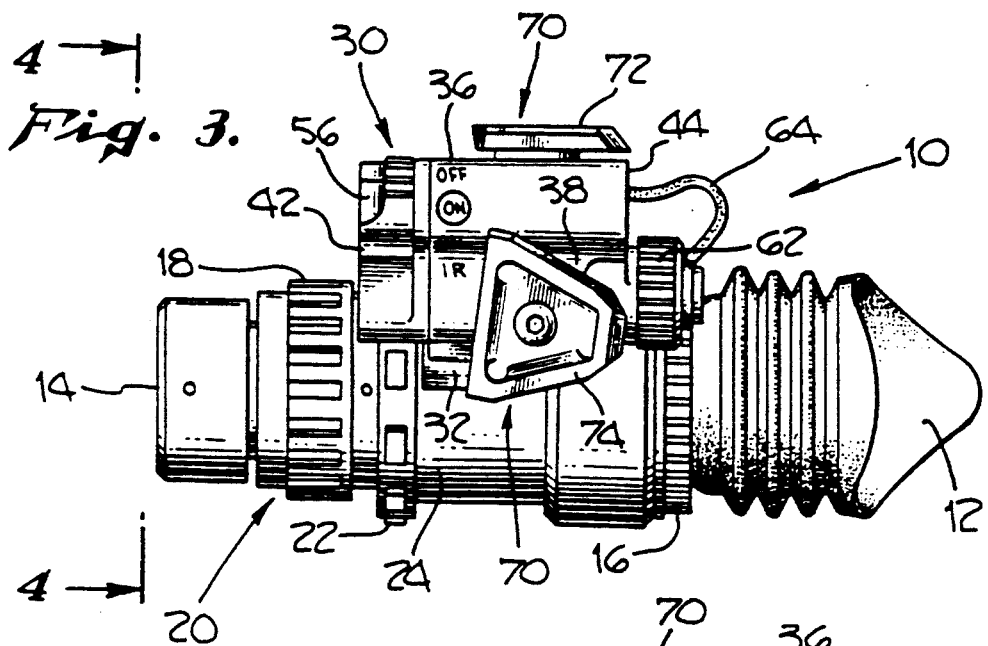
FIG. 3 shows a side view of the night vision monocular system of FIG. 1.

Law enforcement and military forces operating during conditions of near or total darkness have a critical need for lightweight, rugged, and human factors-designed, night vision systems. Referring first to FIG. 1, there is shown a night vision monocular 10. The monocular 10 has an optics portion, shown generally at 20, and a control housing, shown generally at 30. As will be further described below, the control housing contains the circuitry necessary for powering and controlling the optics portion.

The optics portion 20 is generally cylindrical in shape, and comprises an eyepiece 12, an objective lens 14, and an intermediate sleeve portion 24. The eyepiece 12 is shaped to fit against the operator's face, providing a darkened shroud around the operator's eye. The eyepiece 12 also has a flexible bellows 28, which allows the eyepiece to be selectively manipulated so as to perfectly fit any particular operator. At the other end of optics portion 20, objective lens 14 is provided. As will be further described below, an image intensification tube is provided inside sleeve 24, between eyepiece 12 and objective lens 14.

In operation, ambient light enters objective lens 14, passes through the image intensification tube, and then forms an image which is seen by the operator through the eyepiece 12. The operator can make adjustments to the image observed by adjusting objective focus ring 18 and eyepiece focus ring 16. As is well known in the art, the adjustment of these focus rings bring the image into focus.

The optics portion 20 has a collar mount ring 22 with internal threads. The collar mount ring 22 can be unscrewed by the operator to remove objective lens 14 and open optics portion 20. This additionally allows replacement of the image intensification tube. In normal operations, the operator would not open the optics portion 20, but rather it should remain sealed to prevent the introduction of contaminants into the optics portion 20. It is anticipated that a variety of different power objective lenses be adaptable to be screwed onto optics portion 20, giving greater flexibility to the operator.

The optics portion 20 is powered and controlled through circuitry provided inside control housing 30. Control housing 30 is generally triangular in shape, and is form-fit to be easily grasped by an operator. Control housing 30 attaches to optics portion 20 by the use of attachment flange 32 which mounts flush to sleeve 24. An access tunnel 188 is provided within attachment flange 32 and connects to an opening 178 in sleeve 24 as best seen in the cutaway view of FIG. 12. This tunnel 188 provides a passageway between the optics portion and the control housing for electrical wiring. Lanyard ring 26 is also disposed on attachment flange 32, corresponding to a point equivalent to the center of gravity of night vision scope 10. It is anticipated that an operator utilize a lanyard which would attach to ring 26, so that the night vision monocular 10 can hang from the operator's neck when not in use.

The control housing 30 is formed from three generally cylindrical portions, including first cylindrical portion 46, second cylindrical portion 48, and third cylindrical portion 52. Within these cylindrical portions are chambers that house the internal circuitry and battery. These cylindrical portions also allow the three sides of control housing 30 to have rounded edges. It should be readily apparent that these rounded edges make the device more aesthetically pleasing and easier to hold than would otherwise be achieved with a more rectangular-shaped control housing. As will be further described below, the use of individual cylindrical chambers allows the device to be effectively sealed, so as to keep out moisture, dirt, or other contaminants.

Surrounding the three cylindrical portions are facing surface 34, first mounting surface 36, and second mounting surface 38. Facing surface 34 is positioned most adjacent to optics portion 20 and has attachment flange 32 extending from it. Both first mounting surface 36 and second mounting surface 38 are substantially flat and provide an attachment point for the dovetail mount, shown generally at 70. The ends of control housing 30 are framed by forward surface 42 and rearward surface 44. The forward end of third cylindrical portion 52 features rotary switch 56. Rotary switch 50 is substantially flush within switch cavity 58 and has a thumb knob 56 which extends outwardly from the side of third cylindrical portion 52. Infra-red (IR) emitting diode 54 is provided on forward surface 42, and is substantially centered in an end of first cylindrical portion 46. The use of rotary switch 50 allows the operator to turn on night vision monocular 10 and control IR emitting diode 54, as will be further described below.

Second cylindrical portion 48 is intended to hold a single replaceable battery which provides power for the night vision monocular 10. Battery cap 62 is provided on rearward surface 44, and retaining strap 64 attaches the center of battery cap 62 to a portion of control housing 30. The operator replaces the internal battery by unscrewing battery cap 62, exposing an internal battery chamber. It is anticipated that battery cap 62 provide a water tight seal to prevent moisture from entering and possibly contaminating the battery chamber.

Figure 4:
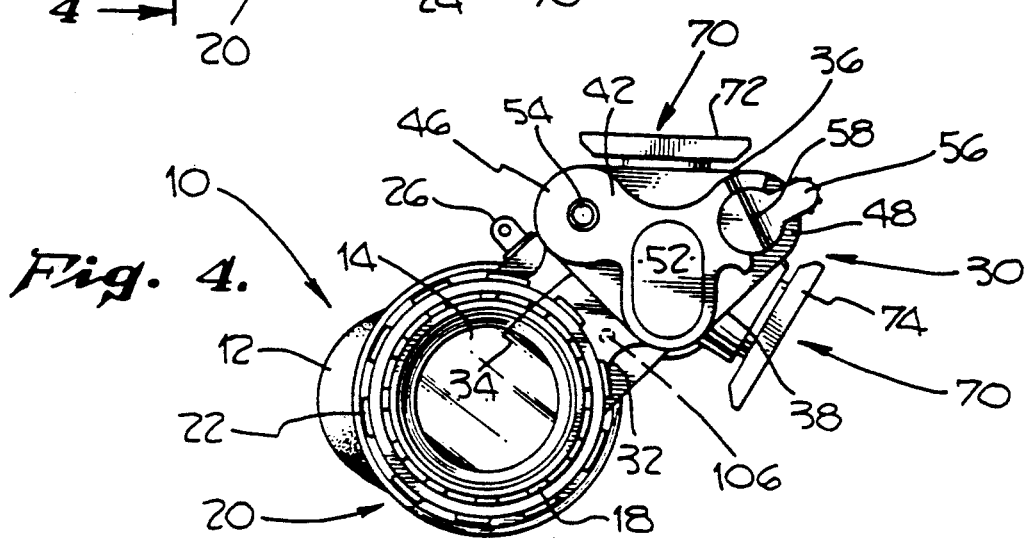
FIG. 4 shows a front view of the night vision monocular system of FIG. 1.

It is further anticipated that first cylindrical portion 46 and third cylindrical portion 52 comprise sealed chambers which are independent from second cylindrical portion 48. A gas purge valve 106, as shown by phantom lines in FIG. 4, provides an input point for the entry of nitrogen gas under pressure. The flow of nitrogen gas forces out air which can cause oxidation of the internal electrical components. It is intended that this gas purge process be performed only by maintenance personnel, and not by the operator.

The sleeve portion 24 and control housing 30 are machined or molded from a lightweight metallic material, such as polycarbonate. The surfaces are then provided with a black oxide finish coating, providing a non-light reflective and easy to grasp surface which is common to military hardware.

It is anticipated that the operator use the night vision system 10 as a convenient pocketscope. As such, the operator can simply grasp the night vision system using control housing 30 as a convenient handle and hold the system up to the operator's eye to view the night environment through eye piece 12. Since the device is very lightweight and compact, it can be readily stowed in one of the operator's pockets or backpack. The pocketscope can also be used in conjunction with a lanyard, as substantially described above. The operator can replace the objective lens 14 with one of greater power, such as three times (3×) power to use the pocketscope in reconnaissance.

It is also anticipated that the operator would occasionally need to keep his hands free to perform other tasks. For these occasions, a mechanism is provided which enables the monocular 10 to be securely fastened in place. Thus, monocular 10 can either be attached to a face mask, as common in the art, or could be used in conjunction with a helmet mount or weapon mount, which will be further disclosed below. Each of these types of mounts utilize a dovetail mounting carriage which can mate with the dual dovetail mounts 70 and 70' provided on control housing 30.

In the present invention, two dovetail mounts 70 are provided, a first one on first mounting surface 36 and a second one on second mounting surface 38. Since the characteristics of both dovetail mounts are identical, only the dovetail mount 70 provided on first mounting surface 36 will be described hereinbelow. It should be apparent that the following description applies equally well to the dovetail mount 70 provided on second mounting surface 38. The dovetail mount 70 has a dovetail plate 72 which is generally trapezoidal in shape. First edge 82 and second edge 84 converge in the direction of the operator's face. The edges 82 and 84 are generally beveled so as to engage a carriage provided with either the face mask or helmet mount, which will both be described below. An intermediate portion of dovetail plate 72 has depression 76, providing an area for mounting screw 78. Mounting screw 78 snugly secures dovetail plate 72 to first mounting surface 36.

Figure 5:
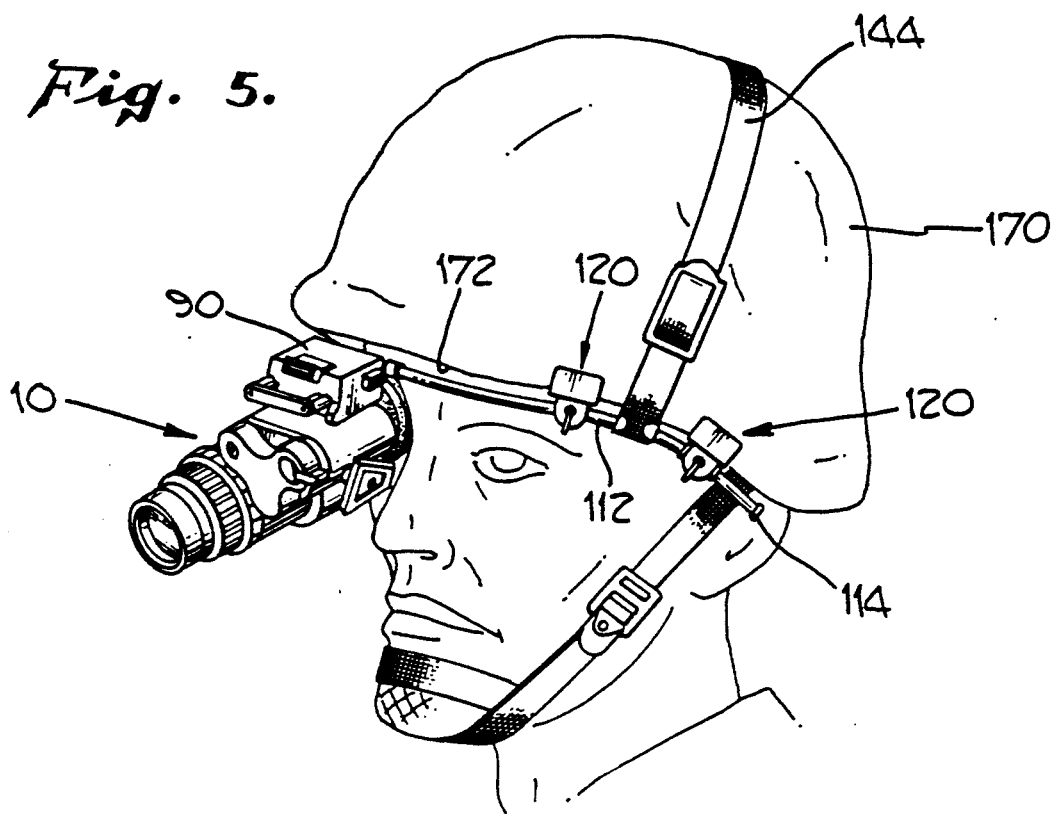
FIG. 5 shows a perspective view of a night vision monocular system in association with a helmet mount assembly, for use with an operator's right eye.
Figure 6:
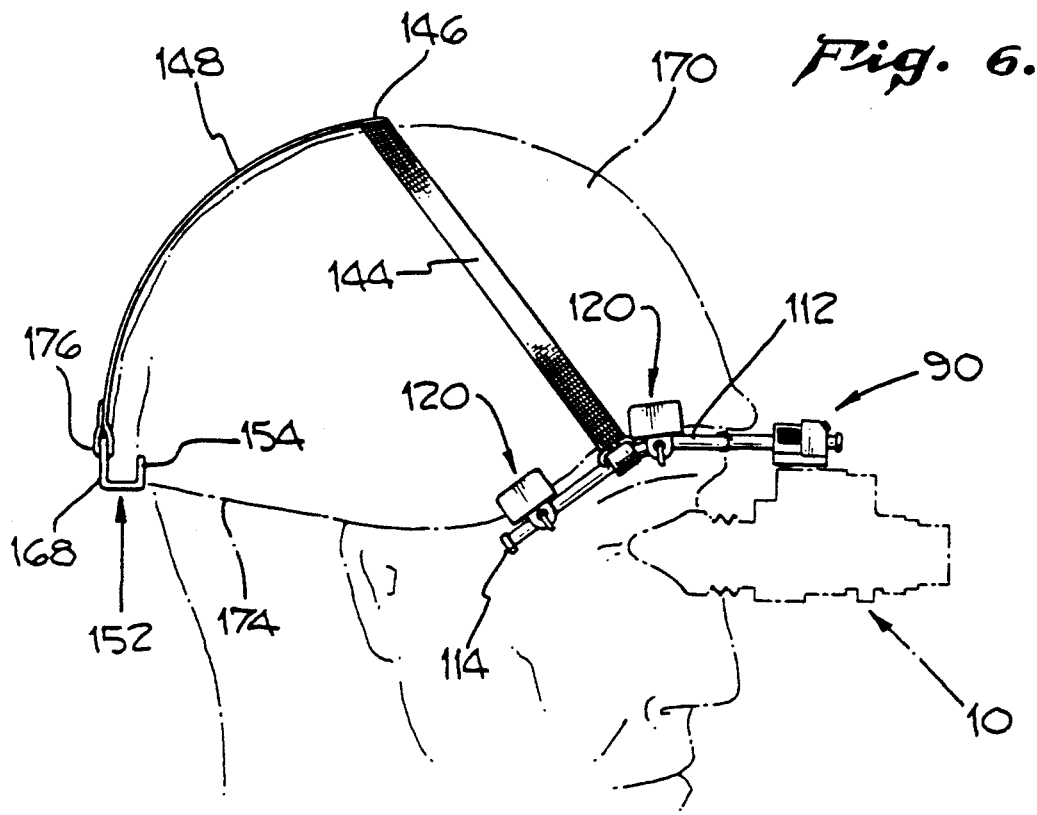
FIG. 6 shows a side view of the helmet mount assembly.

Dovetail mount 70 is intended to be engaged by carriage 90, shown specifically in FIGS. 8 through 11, in association with a helmet mount in FIGS. 5 and 6, and in association with a face mask in FIGS. 17 and 18. Carriage 90 has an engaging portion 92 which is configured to receive dovetail plate 72. A spring-biased locking member 94 is provided to snap into depression 76 and secure dovetail plate 72 to carriage 90. Release button 96 retracts locking member 94 against its bias to allow the dovetail plate to be removed. The carriage 90 is carried by parallel guide bars 98 and 98'. The facing portions of guide bars 98 have a saw tooth track 102 which allows the carriage 90 to be incrementally positioned in the radial direction relative to the operator's face. Track control buttons 104 are provided on either side of carriage 90 to enable the carriage 90 to be freely manipulated along guide bars 98. When the desired radial position is achieved, the operator will release track control buttons 104 to lock carriage 90 in the desired place.

It should be apparent that an important feature of the present invention is the use of two dovetail mounts 70. Since either of the dovetail mounts 70 can engage carriage 90, monocular 10 can be positioned for use by either the right eye, as shown by FIG. 5, or the left eye, as shown by FIG. 7. To change the monocular 10 from one eye to the next, the operator pushes release button 96 with one hand, and with the other hand withdraws dovetail plate 72 from carriage 90. With a single fluid motion, the operator rotates the entire monocular 10 through an arc equivalent to 60°. The operator then inserts the other dovetail plate 72 back into carriage 90 to the locking position. Minor adjustments to eyepiece 12 and to focus rings 16 and 18 can now be done to optimize monocular 10 for use with the new eye. No matter which of the two dovetail mounts 70 are used, rotary switch 56 always remains centered above the operator's nose. Those skilled in the art would appreciate that the monocular 10 can be easily utilized in either a left or a right configuration, and that switching between the two positions can occur readily and accurately.

To further improve the operability of the monocular 10, helmet mount 110 is provided, as shown in FIGS. 5, 6 and 8. Helmet mount 110 comprises a generally C-shaped frame, having attachment points at the center portion for guide bars 98 and 98'. The curvature of frame 112 is intended to mimic that of the standard ballistic helmet 170 which is currently in use by United States Armed Forces. When mounted in place, frame 112 follows along the visor edge 172 of helmet 170. The frame 112 comprises a substantially hollow tube which is bent into the desired shape by known machining methods. The ends of the tube are sealed by end caps 114. The frame 112 is made of lightweight metallic material, such as aluminum, and is also provided with a black oxide coating.

To hold the helmet mount 110 to the ballistic helmet 170, four retainer cushions 120 and head strap 140 are provided. The retainer cushions are shown in greater detail in FIG. 13, and comprise a retaining clip 122, a sleeve grip 124, and a pin 126. The sleeve grip 124 is generally C-shaped and frictionally attaches onto frame 112, such that it can be slid along frame 112 to a desired spot. Sleeve grip 124 has an exterior flattened portion 116 which is opposite to open portion 118 which engages frame 112. The retaining clip 122 is generally U-shaped, having a pair of parallel walls 166 and 166' forming an open portion of a thickness adequate to engage the visor edge 172 of standard helmet 170, as shown in FIGS. 5 and 13. Parallel tail portions 156 and 156' extend in a direction opposite to that of parallel walls 166 and 166' and features a pair of guide holes 158 and notches 164. A pair of half-moon posts 162 extend radially from the sides of sleeve grip 124, as shown in FIGS. 8 and 13. These half-moon posts 162 mate with guide holes 158 providing a pivot point for retaining clips 122. Pivotal travel of retaining clips 122 is limited by contact between the clips and the flattened portion 116. C-shaped pin 126 enters both guide holes 158 from a direction opposite that of half moon posts 162, and extending into the portion above and not occupied by half-moon posts 162. Guide notches 164 are provided in the ends of each of tail portions 156 to engage the pin 126 in a manner which is flush with the bottom of tail portions 156.

The novel retainer cushions 120 firmly grip frame 112, yet can be moved to alternative positions quite easily if readjustment is necessary. The operator would space the four retainer cushions evenly along frame 112 to engage visor 172 of the helmet 170. Since the retainer cushions 120 are easily manipulatable along frame 112, an operator can optimally position the cushions to ensure that frame 112 is snug.

A pair of strap clips 142 and 142' are provided on frame 112 in positions intermediate to the outermost tube of retainer cushions 120. The clips 142 are formed from elongated wire loops with the ends folded inward, and the center portions welded to frame 112. Side straps 144 and 144' engage strap clips 142 and 142' at each of the left and right hand positions. The side straps 144 extend upward along the surface of the helmet to a center joint position 146, where the side straps join with rear strap 148. As shown in FIGS. 5 and 6, rear strap 148 extends backward along the back of the helmet, through slot 176 of hook 152 and loops back along itself. The helmet hook 152 is substantially J-shaped and has an elongated back wall 168. Slot 176 spans the width of back wall 168, and is engaged by rear strap 148 as described above. There is a hook wall 154 with a beveled edge which catches the rear edge 174 of helmet 170. By pulling rear strap 148 snug with helmet hook 152 engaging the rear edge 174 of the helmet 170, helmet mount 110 firmly attaches to helmet 170. Rear strap 148 is then fixed in place by a known securing method, such as Velcro. Other securing methods such as pins, clips or buttons could also be utilized.

It should be apparent that frame 112, when installed using retainer cushions 120 and head strap 140, would provide a stable platform for the installation of monocular 10. Since frame 112 is affixed to the helmet, and not the operator's face, when the helmet is removed from the operator's head, the frame goes with it. If the operator chooses to use the monocular 10 without wearing the helmet, he can do so by holding the monocular 10 in place with his hand. It should also be apparent that when the operator puts the helmet on his head, there if no need for additional adjustment of frame 112.

To make incremental azimuth adjustments to the direction of the monocular 10, it is not necessary to readjust helmet mount 110. Instead, dovetail mounts 70 are rotationally adjustable. Referring to FIGS. 14 through 16, an O-ring gasket 86 is provided below each of dovetail plates 72. Tab 66 is provided in each of mounting surfaces 36 and 38, which is adjacently positioned to engage dovetail slot 88 disposed underneath dovetail plate 72. By rotation of dovetail plate 72 along the axis formed by mounting screw 78, dovetail tab 66 travels in slot 88. As tab 66 reaches the outer ends of slot 88, additional rotational travel of plate 72 is prevented. Thus, the ends of slot 88 provide limit stops 68 to limit the rotational travel of plate 72. In monocular 10, the range of travel within the slot is 8°, as designated by angles a and b of FIGS. 15 and 16, respectively. It should be apparent that an operator can precisely rotate monocular 10 relative carriage 90 to precisely position the axis of optics portion 20 with the operator's eye. It should be further apparent that once this position is achieved, the monocular 10 will remain in this optimal position due to the friction caused by the compression of O-ring gasket 86.

It is further anticipated that the monocular 10 be utilized with face mask 180, as shown in FIGS. 17 and 18. The face mask 180 is well known in the art, and has a face mask frame 182 which partially surrounds the operator's face and a plurality of mask plates 184 which press against specific points on the operator's face. The mask 180 is held to the operator's head by use of head strap 186, scull cap 202 and chin strap 204. The face mask 180 is adapted to utilize a carriage 90 identical to that described above in association with helmet mount 110. Since face masks are in such common usage in the art, it is important that monocular 10 and dovetail mounting plates 70 fully compatible with them. Thus, it should be apparent that the night vision monocular 10 of the present invention can be advantageously used with either face mask 180 or helmet mount 110.

It should be apparent that carriage 90 can be adapted to other fixed external support points to increase the range of usage of monocular 10. For example, carriage 90 can be adapted to be fixed to the upper portion of a weapon such as a rifle. The monocular 10 can then be adapted for use with the rifle by the cooperation of dovetail mount 70 with the carriage 90. Since the operator can use the same night vision scope as a pocketscope, as helmet or face mask mounted, or as mounted to a weapon, it should be apparent that the flexibility of the night vision system is greatly enhanced. The operator need only carry the single night vision device 10 to satisfy each of his needs, rather than utilizing dedicated night vision systems for each of these usages.

To activate the monocular 10, the operator uses rotary switch 56. Rotary switch 56 has three fixed positions, and a fourth pulsed position. The first fixed position represents power off. This position is used when the monocular 10 is not in use. The second position turns the power on to the monocular 10, but only when the dovetail mount 70 has been engaged within carriage 90. This provides an auto-shutoff feature, so that when the operator removes the monocular 10 from its mount with helmet mount 110 or face mask 180, the monocular automatically turns off. This feature is intended to conserve battery power.

The third fixed position of rotary switch 56 also turns the power to monocular 10 on. When placed in this position, the auto-shutoff feature is bypassed, and the monocular 10 will remain powered on even after removal from carriage 90.

The fourth pulsed position of rotary switch 56 controls the IR illumination. Infra-red emitting diode 54 can shine a cone of infra-red light to illuminate objects within the field of view of monocular 10. The IR diode 54 is utilized when the ambient light is extremely low. Since other potentially hostile operators utilizing night vision systems can also see the light emanating from the IR diode 54, the operator Would only pulse the light on for a brief period of time. The rotary switch 56 has an internal spring bias to return the switch from the fourth to the third position. The rotary switch 56 can be an off-the-shelf item, such as the five position F036 switch manufactured by I.T.W. Corporation. An operator must hold the switch into the fourth position for it to remain on. Once the operator lets go of the switch 54, it will return to the third fixed position. This novel use of a spring-biased rotary switch provides an additional margin of safety for the operator.

It is further anticipated that the operator be provided with reliable information showing the operating status of the night vision system. To further ensure that the operator is aware that the IR emitting diode 54 is being utilized, an indicator light is provided inside optics portion 20, as shown generally at 190 of FIG. 12. The indicator light 190 also informs the operator that the internal battery power is running low. Indicator light 190 comprises a first light-emitting diode (LED) 192 and a second LED 194. The LED's are combined on a strip of mylar tape 196 which emerges through the passageway 188 provided between control housing 30 and optics portion 20. The tape 196 is mounted within optics portion 20 parallel to the image viewed through the eyepiece 12, and outside the circumference of the image. In the preferred embodiment of the present invention, first LED 192 is red, and second LED 194 is yellow. The red LED 192 is illuminated when the IR emitting diode 54 is being utilized. The yellow LED 192 is illuminated when the battery power has dropped below a minimum amount. The operator would see either the red LED 192, the yellow LED 194, or both LED's when looking in the eyepiece 12 of monocular 10. Thus, it should be clear that the operator can tell the status of monocular 10 while observing through eyepiece 12 and without removing monocular 10 from attachment with carriage 90.

Having thus described a preferred embodiment of a night vision monocular system, it should now be apparent to those skilled in the art that the aforestated objects and advantages for the within system have been achieved. It should also be appreciated by those skilled in the art that various modifications, adaptations, and alternative embodiments thereof may be made within the scope and spirit of the present invention. For example, control housing 340 could be formed of alternative shapes, such as rectangular, and could have more or less than three internal chambers. The dovetail plates 70 also could be formed of alternative shapes, such as triangular or rectangular, so long as the carriage 90 which receives each of dovetail plates 70 have a corresponding shape. The frame 112 for mounting monocular 10 to a ballistic helmet 170 could be shaped to be mounted to other helmets, such as an aviator or policeman's helmet. The present invention is further defined by the following claims.

What is claimed is:

1. A night vision monocular, comprising:
   an optical portion having an objective lens, an eyepiece and an image intensification means for intensifying a received image intermediate said objective lens and said eyepiece;
   a control housing affixed to said optical portion and having internal circuitry for powering said optical portion; and
   a means for selectively mounting said monocular in either of two operational positions corresponding to a desired one of an operator's eyes and being rapidly switchable between said operational positions, said selective mounting means further comprising:
   a first dovetail mounting plate affixed to a first surface of said control housing, and a second dovetail mounting plate affixed to a second surface of said control housing;
   a carriage configured to receive a selected one of said dovetail plates and means for securing said selected dovetail plate within said carriage; and
   a frame conforming to the shape of the visor of a helmet worn by said operator, and carrying said carriage in a central portion of said frame, and means for attaching said frame to 'said helmet, said carriage being selectively adjustable relative said frame to vary the distance between the operator and said eyepiece.

2. The night vision monocular of claim 1, wherein said attaching means further comprises:
   a plurality of adjustable cushions frictionally mounted on said frame, said cushions each having a sleeve portion gripping said frame, a retaining portion pivoting from said sleeve portion and engaging said visor, and a pin securing said retaining portion to said sleeve portion;
   an adjustable strap having a left and right portion attaching to said frame at left and right attachment points respectively, and a rear portion joining to said left and right portions relative to the top of said helmet;
   a hook provided at the end of said rear portion to engage the back of said helmet.

3. The night vision monocular of claim 2, wherein:
   said sleeve portions are generally C-shaped, having an internal surface which conforms to and frictionally engages said frame, an exterior surface having a substantially flat portion and a pair of half-moon shaped posts protruding outward from said exterior surface on opposite sides of said flat portion;
   said retaining portions comprise a pair of retaining walls joined by a substantially flat base and a pair of semicircular tabs extending below said base substantially parallel to said walls, said tabs each having an opening in the center and a notch at the bottom, said posts engaging said openings enabling said retaining portions to pivot relative said sleeve portions with pivotal travel limited by contact between said base and said flat portion of said sleeve portions; and
   said pin is generally C-shaped, having ends which extend outwardly from the part of said openings left unoccupied by said half-moon posts, traveling downward along said tabs to engage said notches.

4. The night vision monocular of claim 3, wherein said frame comprises a substantially hollow aluminum tube having sealed ends and a black oxide finish.

5. The night vision monocular of claim 4, wherein said left and right attachment points comprise elongated wire loops having ends folded inward and an intermediate portion welded to said frame, said left and right straps having ends which wrap around said frame and wire loop combinations with said folded ends enveloping the sides of said straps to preclude lateral movement of said straps relative said frame.

6. The night vision monocular of claim 5, wherein said hook is substantially J-shaped having an elongated back wall, a slot spanning said back wall, a hook wall having a beveled edge, and a base joining said back wall and said hook wall, said rear portion of said strap feeding through said slot and fastening to itself along the length of said rear portion.

7. The night vision monocular of claim 6, wherein said frame has a pair of parallel support bars extending outwardly relative the operator from the center portion of said frame, each of said bars having a sawtooth track disposed thereon;

whereby, said carriage travels on said support bars and cooperates with said track to remain secured in a desired position.

8. A night vision system, comprising:
an optical portion for receiving and intensifying an image;
a means for mounting said optical portion to a helmet in either of two fixed operational positions corresponding to a desired one of an operator's eyes and being rapidly switchable between said operational positions;
further comprising a control housing affixed to said optical portion and having an internal battery for powering said optical portion;
wherein said mounting means comprises:
a first dovetail mounting plate affixed to a first surface of said control housing, and a second dovetail mounting plate affixed to a second surface of said control housing; and
a carriage configured to receive as elected one of said dovetail plates and means for securing said selected dovetail plate within said carriage.

9. The night vision system of claim 8, wherein said mounting means further comprises:
a frame conforming to the shape of the visor of said helmet worn by said operator, and carrying said carriage in a central portion of said frame, and means for attaching said frame to said helmet.

10. The night vision system of claim 9, wherein said attaching means further comprises:
a plurality of adjustable cushions frictionally mounted on said frame and engaging said visor;
an adjustable strap having a left and right portion attaching to said frame at left and right attachment points respectively, and a rear portion joining to said left and right portions relative to the top of said helmet; and
a hook provided at the end of said rear portion to engage the back of said helmet.

11. The night vision system of claim 10, wherein each of said adjustable cushions further comprises a sleeve portion gripping said frame, a retaining portion pivoting from said sleeve portion and engaging said visor, and a pin securing said retaining portion to said sleeve portion.

12. The night vision system of claim 11, wherein:
said sleeve portions are generally C-shaped, having an internal surface which conforms to and frictionally engages said frame, an exterior surface having a substantially flat portion and a pair of half-moon shaped posts protruding outward from said exterior surface on opposite sides of said flat portion;

said retaining portions comprise a pair of retaining walls joined by a substantially flat base and a pair of semicircular tabs extending below said base substantially parallel to said walls, said tabs each having an opening in the center and a notch at the bottom, said posts engaging said openings enabling said retaining portions to pivot relative said sleeve portions with pivotal travel limited by contact between said base and said flat portion of said sleeve portions; and
said pin is generally C-shaped, having ends which extend outwardly from the part of said openings left unoccupied by said half-moon posts, traveling downward along said tabs to engage said notches.

13. The night vision system of claim 12, wherein said frame comprises a substantially hollow metallic tube having sealed ends and a black oxide finish.

14. The night vision system of claim 13, wherein said left and right attachment points comprise elongated wire loops having ends folded inward and an intermediate portion welded to said frame, said left and right straps having ends which wrap around said frame and wire loop combinations with said folded ends enveloping the sides of said straps to preclude lateral movement of said straps relative said frame.

15. The night vision system of claim 14, wherein said hook is substantially J-shaped having an elongated back wall, a slot spanning said back wall, a hook wall having a beveled edge, and a base joining said back wall and said hook wall, said rear portion of said strap feeding through said slot and fastening to itself along the length of said rear portion.

16. The night vision system of claim 15, wherein said frame has a pair of parallel support bars extending outwardly relative the operator from the center portion of said frame, each of said bars having a sawtooth track disposed thereon;

whereby, said carriage travels on said support bars and cooperates with said track to remain secured in a desired position.

17. The night vision system of claim 8, further comprising means for adjusting the azimuth of said system relative the operator's eye, comprising a tab disposed in each of said first surface and said second surface, an arcuate slot in the underside of each of said mounting plates and engaging said tabs, and an 0-ring positioned between a respective one of said surfaces and said dovetail mounting plates, said mounting plates being rotatable along an arc of travel relative said surfaces with the ends of said slots providing rotation limit stops.

18. The night vision system of claim 8, wherein said control housing is generally triangular with rounded edges and is of a size and weight conducive to grasping with an operator's single hand for use as a pocketscope.

19. The night vision system of claim 8, wherein said control housing further comprises an attachment flange which connects to said optical portion and an internal passageway for routing of electrical wiring between said control housing and said optical portion.

20. The night vision system of claim 8, further comprising an illuminator means for momentarily illuminating the field of view of said optical portion with infrared light, and a switch spring biased to the "off" position for energizing said illuminator means.

21. The night vision system of claim 20, wherein said illuminator means further comprises:
an infra-red emitting diode mounted on a forward surface of said control housing, said diode capable of projecting a cone of infra-red light into an area corresponding with said field of view; and said spring biased switch is mounted on said control housing and is electrically connected to said diode to energize said diode only by the intentional manipulation of said switch against its bias, said switch returning to a position de-energizing said diode upon release of said switch.

22. The night vision system of claim 21, further comprising an indicator means for indicating to the operator that said diode is energized.

23. The night vision system of claim 22, wherein said indicator means further comprises:

a light-emitting diode (LED), and a means for mounting said LED on an interior portion of said optical portion.

24. The night vision system of claim 23, wherein said LED is illuminated when said infra-red emitting diode is energized, said LED being visible to said operator when looking through said optical portion.

25. The night vision system of claim 24, wherein said LED mounting means further comprises a substantially flexible mylar tape.

26. The night vision system of claim 21, further comprising means for indicating to the operator that said battery has dropped below a minimum power.

27. The night vision system of claim 26, wherein said battery indicating means further comprises:

a light-emitting diode (LED), and a means for mounting said LED on an interior portion of said optical portion.

28. The night vision system of claim 27, wherein said LED is illuminated when said battery power has dropped below said minimum amount, and said LED is visible to said operator when looking through said optical portion.

29. The night vision system of claim 28, wherein said LED mounting means further comprises a substantially flexible mylar tape.

30. The night vision system of claim 25, further comprising an indicator means for indicating to the operator that said diode is energized and for indicating to the operator that electrical power to said optical portion has dropped below a minimum amount.

31. The night vision system of claim 30, wherein said indicator means further comprises:

a first light-emitting diode (LED), a second LED, and a means for mounting said first and second LEDs on an interior portion of said optical portion.

32. The night vision system of claim 31, wherein said first LED is illuminated when said infra-red emitting diode is energized, and said second LED is illuminated when said electrical power has dropped below said minimum amount, said first and second LEDs being visible to said operator when looking through said optical portion.

33. The night vision system of claim 32, wherein said LED mounting means further comprises a substantially flexible mylar tape.

34. The night vision system of claim 8, further comprising means for introducing an inert gas into said control housing to prevent contamination of said internal circuitry.

35. The night vision system of claim 8, further comprising means for shutting off electrical power to said system upon removal of said system from engagement with said carriage.

36. The night vision system of claim 8, wherein each of said dovetail mounting plates have a generally trapezoidal shape, with edges converging in the direction of said eyepiece, and said carriage has a receiving portion having a shape corresponding to that of said dovetail mounting plates.

37. The night vision system of claim 36, wherein said carriage is selectively adjustable relative said frame to vary the distance between the operator and said eyepiece.

38. A night vision system, comprising:

an optical portion for receiving and intensifying an image;

a means for selectively mounting said optical portion to a face mask in either of two operational positions corresponding to a desired one of an operator's eyes and being rapidly switchable between said operational positions; wherein said face mask further comprises a frame partially surrounding the operator's face, a plurality of mask plates carried by said frame and pressing against specified points of the operator's face, and a strap affixed to said frame at a plurality of points and wrapping around the operator's head;

whereby said mark can be firmly affixed to the operator's head by the intentional tightening of said strap; further comprising a control housing affixed to said optical portion and having an internal battery for powering said optical portion; wherein said selective mounting means further comprises:

a first dovetail mounting plate affixed to a first surface of said control housing, and a second dovetail mounting plate affixed to a second surface of said control housing; and a carriage centrally positioned on said face mask frame and configured to receive a selected one of said dovetail plates and means for securing said selected dovetail plate within said carriage.

39. The night vision system of claim 38, wherein said carriage is selectively adjustable relative said mask to vary the distance between the operator and said eyepiece.

40. The night vision system of claim 39, wherein each of said dovetail mounting plates have a generally trapezoidal shape, with edges converging in the direction of said eyepiece, and said carriage has a receiving portion having a shape corresponding to said dovetail mounting plate.

41. The night vision system of claim 38, further comprising means for adjusting the azimuth of said system relative the operator's eye, comprising a tab disposed in each of said first surface and said second surface, an arcuate slot in the underside of each of said mounting plates and engaging said tabs, and an O-ring positioned between a respective one of said surfaces and said dovetail mounting plates, said mounting plates being rotatable along an arc of travel relative said surfaces with the ends of said slots providing rotation limit stops.

42. The night vision system of claim 38, wherein said control housing is generally triangular with rounded edges and is of a size and weight conducive to grasping with an operator's single hand 43. A night vision monocular comprising:

a housing at a forward end carrying an objective lens for receiving light from a scene to be imaged, said housing at an aft end including an eyepiece in which an enhanced image of said scene may be viewed, and said hosing further carrying an image intensifier tube receiving said light and producing said enhanced image;

said housing in frontal view including a portion thereof which is generally triangularly-shaped and which includes first and second mutually angulated mounting surfaces each carrying a respective quick-coupling/quick-release mounting feature;

said eyepiece being offset with respect to said first and second mounting features along a line substantially bisecting said mutual angulation between said mounting surfaces of said triangularly-shaped housing to align said eyepiece with a respective eye of a human user dependent upon which one of said mounting features is engaged with a support structure centered forwardly of an above said user's eyes.

* * * * *